United States Patent
Rusich

(10) Patent No.: US 12,043,295 B2
(45) Date of Patent: Jul. 23, 2024

(54) HYPERLOOP VAPOR CYCLE ENVIRONMENTAL CONTROL SYSTEM

(71) Applicant: Hamilton Sundstrand Corporation, Charlotte, NC (US)

(72) Inventor: Richard Rusich, Ellington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/074,613

(22) Filed: Dec. 5, 2022

(65) Prior Publication Data

US 2024/0182086 A1 Jun. 6, 2024

(51) Int. Cl.
*B61D 27/00* (2006.01)
*B61B 13/10* (2006.01)
*F25B 19/00* (2006.01)

(52) U.S. Cl.
CPC .......... *B61D 27/0072* (2013.01); *B61B 13/10* (2013.01); *F25B 19/00* (2013.01)

(58) Field of Classification Search
CPC .... F25B 19/00; F25B 23/006; B61D 27/0018; B61D 27/0027; B61D 27/0072; B60L 13/04
See application file for complete search history.

(56) References Cited

U.S. PATENT DOCUMENTS

| 10,052,932 B2 | 8/2018 | Zhou et al. | |
|---|---|---|---|
| 2010/0064697 A1 * | 3/2010 | Sedlak | F25B 30/06 62/238.7 |

FOREIGN PATENT DOCUMENTS

| CN | 108583602 A | * | 9/2018 | ............ B61B 13/10 |
|---|---|---|---|---|
| CN | 111231670 A | | 6/2020 | |
| WO | 2022119439 A1 | | 6/2022 | |

OTHER PUBLICATIONS

Abstract for CN111231670 (A), Published: Jun. 5, 2020, 1 page.
European Search Report for Application No. 23213661.4, mailed Apr. 24, 2024, 12 pages.

* cited by examiner

*Primary Examiner* — Joseph F Trpisovsky
(74) *Attorney, Agent, or Firm* — CANTOR COLBURN LLP

(57) ABSTRACT

The present disclosure provides for hyperloop vapor cycle environmental control systems (ECS) and related methods. More particularly, the present disclosure provides for hyperloop vapor cycle environmental control systems and methods, with the hyperloop vapor cycle environmental control systems and methods configured without a compressor needed to pump a refrigerant through the system and configured without a condenser heat exchanger needed to condense gas refrigerant to a liquid to reject the heat of compression of a compressor to the ambient atmosphere. Since there is no need for a compressor, the example hyperloop ECS of the present disclosure requires only a small fraction of the electrical power of a standard vapor cycle air conditioning system. Power is needed substantially only for the ECS controller and some various valves.

20 Claims, 1 Drawing Sheet

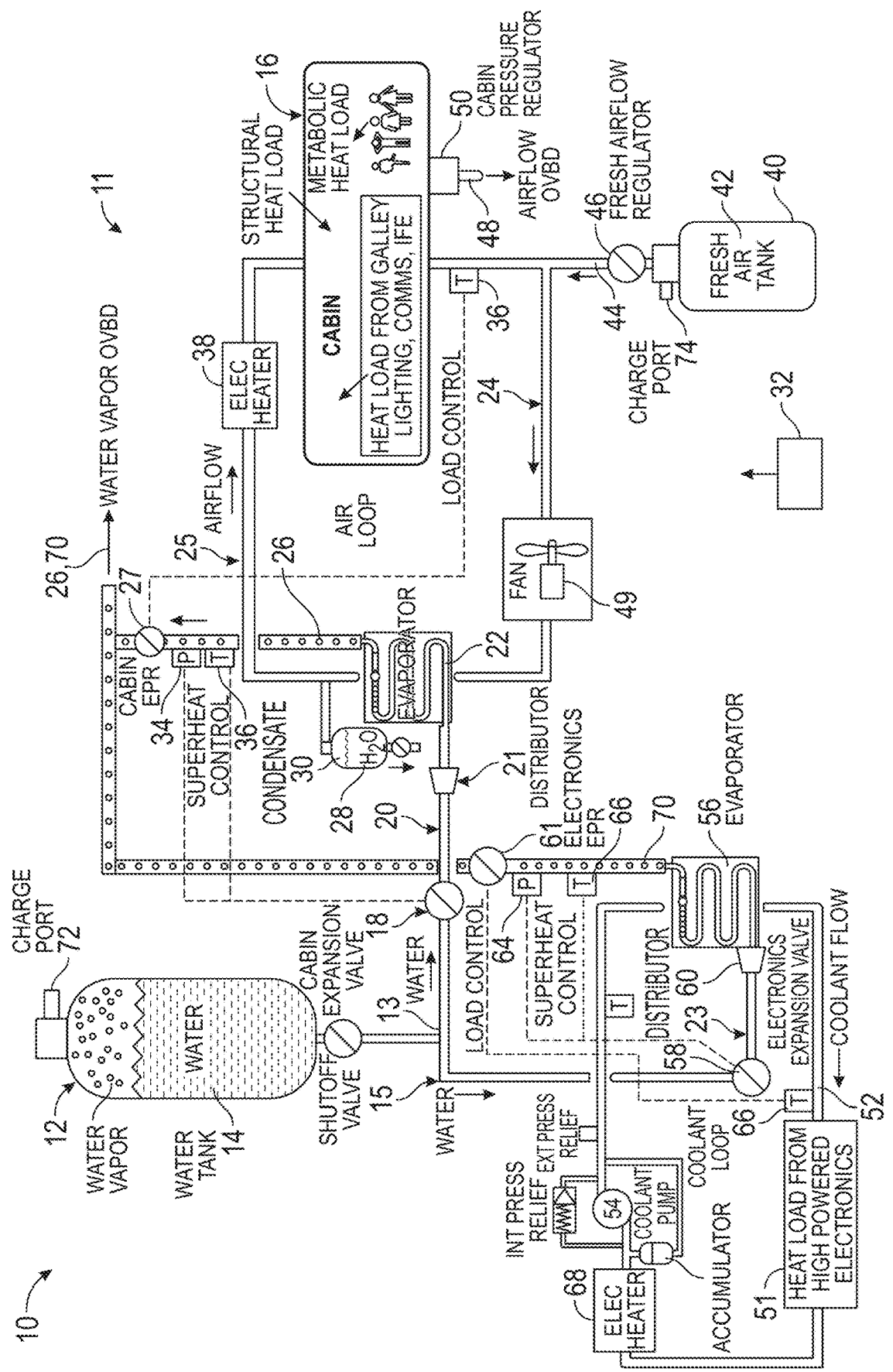

HYPERLOOP VAPOR CYCLE ENVIRONMENTAL CONTROL SYSTEM

TECHNICAL FIELD

The present disclosure relates to hyperloop vapor cycle environmental control systems (ECS) and related methods and, more particularly, to hyperloop vapor cycle environmental control systems and methods, with the hyperloop vapor cycle environmental control systems and methods configured without a compressor needed to pump a refrigerant through the system.

BACKGROUND

In general, a high speed public transportation concept called the hyperloop has been proposed that can include a vehicle similar to a train car that travels inside of a tube. The air in the tube can be evacuated to a very deep vacuum, allowing the train to reach very high speeds without incurring the high power demand that would otherwise be needed to overcome the high aerodynamic drag at normal atmospheric pressure. An air lock can permit passenger boarding and disembarking from the train station to the train without discharging the atmospheric air in the station into the vacuum in the tube.

As with similar transportation vehicles, environmental control of the occupied cabin is generally required to maintain adequate comfort and to provide heating, cooling and/or a continual supply of fresh air. Some typical methods used to provide air conditioning may not be conducive to this application. For example, many air conditioning systems exist which provide cool air to the cabin and on-board electronics which ultimately pump the heat to the ambient atmosphere via convection heat transfer. When the ambient atmosphere is non-existent, as in space applications, heat can be rejected to deep space via radiation heat transfer. In the case of the hyperloop, there is little to no atmosphere in the tube, so rejecting heat into the tube via convection may not be practical while maintaining a reasonably sized heat exchanger to reject the heat. Moreover, heat rejection via radiation may also not be practical, since unlike radiating to space, which is near absolute zero degrees in temperature, the walls of the tube can be warmer than inside the cabin when the outside ambient temperature is warm. Moreover, while the train is moving at high speed, the amount of available electrical power consumption is limited since power is generally supplied solely by on-board batteries that have a limited quantity of electrical energy. The air conditioning system therefore should not consume large amounts of power to operate.

BRIEF DESCRIPTION

The present disclosure provides for hyperloop vapor cycle environmental control systems (ECS) and related methods. More particularly, the present disclosure provides for hyperloop vapor cycle environmental control systems and methods, with the hyperloop vapor cycle environmental control systems and methods configured without a compressor needed to pump a refrigerant through the system and configured without a condenser heat exchanger needed to condense gas refrigerant to a liquid to reject the heat of compression of a compressor to the ambient atmosphere.

The present disclosure provides for a hyperloop vapor cycle environmental control system including a vehicle cabin of a vehicle positioned in an air-evacuated tube of a hyperloop; a water vessel positioned on board the vehicle, the water vessel housing water and steam at a pressure greater than a pressure of the air-evacuated tube; wherein a first portion of the water from the water vessel is configured to flow through a cabin expansion valve where a pressure and a temperature of the first portion of the water is reduced below a temperature of the vehicle cabin thereby turning the first portion of the water into a two-phase water and vapor stream, the two-phase water and vapor stream thereafter configured to enter a first evaporator heat exchanger where the two-phase water and vapor stream absorbs heat from a flow of entering warm cabin air, thereby reducing a temperature of the entering warm cabin air and providing a flow of cooled cabin air that exits the first evaporator heat exchanger, with the cooled cabin air configured to re-enter the vehicle cabin for cooling purposes of the vehicle cabin; and wherein the heat absorbed into the two-phase water and vapor stream results in the water from the two-phase water and vapor stream evaporating, thereby yielding produced steam that is configured to exit the first evaporator heat exchanger.

In addition to one or more of the features described, or as an alternative to any of the foregoing embodiments, the flow of entering warm cabin air is cooled without a compressor to pump the first portion of the water and without a condenser heat exchanger to condense a gas refrigerant to a liquid.

In addition to one or more of the features described, or as an alternative to any of the foregoing embodiments, the produced steam is exhausted into the air-evacuated tube.

In addition to one or more of the features described, or as an alternative to any of the foregoing embodiments, wherein a quality of the two-phase water and vapor stream in the first evaporator heat exchanger is configured to be controlled by the cabin expansion valve, and a pressure and a temperature of the two-phase water and vapor stream in the first evaporator heat exchanger is configured to be controlled by an evaporator pressure regulator valve; and wherein the cabin expansion valve and the evaporator pressure regulator valve are configured to receive commands from a first controller in response to feedback from at least one first pressure sensor or first temperature sensor located in the system.

In addition to one or more of the features described, or as an alternative to any of the foregoing embodiments, further including an air tank housing high pressure air, the air tank configured to provide a flow of fresh air to the vehicle cabin via a fresh airflow regulator valve, with a circulation fan configured to pump the flow of fresh air through the first evaporator heat exchanger and move the flow of fresh air about the cabin.

In addition to one or more of the features described, or as an alternative to any of the foregoing embodiments, wherein a second portion of the water from the water vessel is configured to flow through an electronics expansion valve where a pressure and a temperature of the second portion of the water is reduced, thereby turning the second portion of the water into a secondary two-phase water and vapor stream, the secondary two-phase water and vapor stream thereafter configured to enter a second evaporator heat exchanger where the two-phase water and vapor stream absorbs heat from a flow of warmed liquid media flowed through or adjacent to at least one electronic member, thereby reducing a temperature of the entering warmed liquid media and providing a flow of cooled liquid media that exits the second evaporator heat exchanger, with the cooled liquid media configured to be re-flowed through or adjacent to the at least one electronic member for cooling purposes of the at least one electronic member; and wherein the heat absorbed into the secondary two-phase water and vapor stream results in the water from the secondary two-phase water and vapor stream evaporating, thereby yielding secondary produced steam that is configured to exit the second evaporator heat exchanger.

In addition to one or more of the features described, or as an alternative to any of the foregoing embodiments, the flow of entering warmed liquid media is cooled without a compressor to pump the second portion of the water and without a condenser heat exchanger to condense a gas refrigerant to a liquid.

In addition to one or more of the features described, or as an alternative to any of the foregoing embodiments, the secondary produced steam is exhausted into the air-evacuated tube.

In addition to one or more of the features described, or as an alternative to any of the foregoing embodiments, wherein a quality of the secondary two-phase water and vapor stream in the second evaporator heat exchanger is configured to be controlled by the electronics expansion valve, and a pressure and a temperature of the secondary two-phase water and vapor stream in the second evaporator heat exchanger is configured to be controlled by a secondary evaporator pressure regulator valve; and wherein the electronics expansion valve and the secondary evaporator pressure regulator valve are configured to receive commands from a second controller in response to feedback from at least one second pressure sensor or second temperature sensor located in the system.

In addition to one or more of the features described, or as an alternative to any of the foregoing embodiments, the vehicle is a train and the vehicle cabin is a train cabin.

The present disclosure provides for a method for operating a hyperloop vapor cycle environmental control system for a vehicle cabin of a vehicle positioned in an air-evacuated tube of a hyperloop, the vehicle including a water vessel positioned on board the vehicle, the water vessel housing water and steam at a pressure greater than a pressure of the air-evacuated tube, the method including determining that the vehicle cabin should be cooled; flowing a first portion of the water from the water vessel through a cabin expansion valve where a pressure and a temperature of the first portion of the water is reduced below a temperature of the vehicle cabin thereby turning the first portion of the water into a two-phase water and vapor stream, the two-phase water and vapor stream thereafter entering a first evaporator heat exchanger where the two-phase water and vapor stream absorbs heat from a flow of entering warm cabin air thereby reducing a temperature of the entering warm cabin air and providing a flow of cooled cabin air that exits the first evaporator heat exchanger, with the cooled cabin air re-entering the vehicle cabin for cooling purposes of the vehicle cabin; and wherein the heat absorbed into the two-phase water and vapor stream results in the water from the two-phase water and vapor stream evaporating, thereby yielding produced steam that exits the first evaporator heat exchanger.

In addition to one or more of the features described, or as an alternative to any of the foregoing embodiments, the flow of entering warm cabin air is cooled without a compressor to pump the first portion of the water and without a condenser heat exchanger to condense a gas refrigerant to a liquid.

In addition to one or more of the features described, or as an alternative to any of the foregoing embodiments, further including exhausting the produced steam into the air-evacuated tube.

In addition to one or more of the features described, or as an alternative to any of the foregoing embodiments, further including controlling a quality of the two-phase water and vapor stream in the first evaporator heat exchanger by the cabin expansion valve, and controlling a pressure and a temperature of the two-phase water and vapor stream in the first evaporator heat exchanger by an evaporator pressure regulator valve; and wherein the cabin expansion valve and the evaporator pressure regulator valve are configured to receive commands from a first controller in response to feedback from at least one first pressure sensor or first temperature sensor located in the system.

In addition to one or more of the features described, or as an alternative to any of the foregoing embodiments, further including an air tank housing high pressure air, the air tank providing a flow of fresh air to the vehicle cabin via a fresh airflow regulator valve, with a circulation fan pumping the flow of fresh air through the first evaporator heat exchanger and moving the flow of fresh air about the cabin.

In addition to one or more of the features described, or as an alternative to any of the foregoing embodiments, wherein a second portion of the water from the water vessel is configured to flow through an electronics expansion valve where a pressure and a temperature of the second portion of the water is reduced, thereby turning the second portion of the water into a secondary two-phase water and vapor stream, the secondary two-phase water and vapor stream thereafter entering a second evaporator heat exchanger where the two-phase water and vapor stream absorbs heat from a flow of warmed liquid media flowed through or adjacent to the at least one electronic member, thereby reducing a temperature of the entering warmed liquid media and providing a flow of cooled liquid media that exits the second evaporator heat exchanger, with the cooled liquid media re-flowing through or adjacent to the at least one electronic member for cooling purposes of the at least one electronic member; and wherein the heat absorbed into the secondary two-phase water and vapor stream results in the water from the secondary two-phase water and vapor stream evaporating, thereby yielding secondary produced steam that exits the second evaporator heat exchanger.

In addition to one or more of the features described, or as an alternative to any of the foregoing embodiments, the flow of entering warmed liquid media is cooled without a compressor to pump the second portion of the water and without a condenser heat exchanger to condense a gas refrigerant to a liquid.

In addition to one or more of the features described, or as an alternative to any of the foregoing embodiments, further including exhausting the secondary produced steam into the air-evacuated tube.

In addition to one or more of the features described, or as an alternative to any of the foregoing embodiments, further including controlling a quality of the secondary two-phase water and vapor stream in the second evaporator heat exchanger by the electronics expansion valve, and controlling a pressure and a temperature of the secondary two-phase water and vapor stream in the second evaporator heat exchanger by a secondary evaporator pressure regulator valve; and wherein the electronics expansion valve and the secondary evaporator pressure regulator valve are configured to receive commands from a second controller in response to feedback from at least one second pressure sensor or second temperature sensor located in the system.

In addition to one or more of the features described, or as an alternative to any of the foregoing embodiments, the vehicle is a train and the vehicle cabin is a train cabin.

The above described and other features are exemplified by the following FIGURES and detailed description.

Any combination or permutation of embodiments is envisioned. Additional features, functions and applications of the disclosed systems, assemblies and methods of the present disclosure will be apparent from the description which follows, particularly when read in conjunction with the appended FIGURES. All references listed in this disclosure are hereby incorporated by reference in their entireties.

BRIEF DESCRIPTION OF THE DRAWINGS

The following FIGURES are example embodiments wherein the like elements are numbered alike.

Features and aspects of embodiments are described below with reference to the accompanying drawings, in which elements are not necessarily depicted to scale.

Example embodiments of the present disclosure are further described with reference to the appended figures. It is to be noted that the various features, steps, and combinations of features/steps described below and illustrated in the FIGURES can be arranged and organized differently to result in embodiments which are still within the scope of the present disclosure. To assist those of ordinary skill in the art in making and using the disclosed systems, assemblies and methods, reference is made to the appended FIGURES, wherein:

The FIGURE is a schematic of an example hyperloop environmental control system (ECS), according to the present disclosure.

DETAILED DESCRIPTION

The example embodiments disclosed herein are illustrative of hyperloop vapor cycle environmental control systems, and assemblies of the present disclosure and methods/techniques thereof. It should be understood, however, that the disclosed embodiments are merely examples of the present disclosure, which may be embodied in various forms. Therefore, details disclosed herein with reference to example hyperloop vapor cycle environmental control systems and associated processes/techniques of fabrication/assembly and use are not to be interpreted as limiting, but merely as the basis for teaching one skilled in the art how to make and use the systems/assemblies and/or alternative systems/assemblies of the present disclosure.

The present disclosure provides for hyperloop vapor cycle environmental control systems and related methods. More particularly, the present disclosure provides for hyperloop vapor cycle environmental control systems and methods, with the hyperloop environmental control systems and methods configured without a compressor needed to pump a refrigerant through the system and configured without a condenser heat exchanger needed to condense gas refrigerant to a liquid to reject the heat of compression of a compressor to the ambient atmosphere.

The FIGURE is a schematic of an example hyperloop vapor cycle environmental control system (ECS) 10, according to the present disclosure.

As shown in the FIGURE, an on-board vessel 12 (e.g., water tank 12) can be filled with hot water 14 and/or steam while the vehicle and vehicle cabin 16 (e.g., train cabin 16) is at its station. At this condition, the water 14 is thermodynamically a saturated liquid and at a pressure greater than the pressure of the vehicle/train tube 11.

When cooling of the cabin 16 is required or desired, a first portion 13 of the water 14 flows through a cabin expansion valve 18, where the pressure and temperature of the first portion 13 of water 14 is reduced below the temperature of the cabin 16, turning the saturated liquid water 13 into two phase water and vapor (steam) 20. The cold two-phase water 20 enters the evaporator heat exchanger 22 (e.g., via distributor 21) where heat is absorbed from the entering warm cabin air 24, thus reducing the temperature of the cooled cabin air 25 that exits the evaporator 22.

The heat absorbed into the two-phase water 20 does not increase its temperature, but instead results in the water portion 20 completely evaporating, yielding substantially 100% steam 26 exiting the evaporator 22. The quantity of heat absorbed to transform the water 20 into steam 26 is its latent heat of vaporization.

The steam 26 exiting the evaporator 22 can be exhausted into the evacuated tube 11 of system 10. The pressure inside the on-board water vessel 12 can be sufficiently higher than the pressure inside the tube 11 of system 10, thereby negating the need for a pump. The chilled cabin air 25 exiting the evaporator 22 may likely condense some water vapor as the air 24 can be humid from the metabolic heat load (e.g., sweating of the passengers in cabin 16). The water 28 can easily be separated from the air 25 and drained into a small holding (condensate) tank 30 and/or can be exhausted. It is noted that the example duct exiting the tank 30 is open-ended to the evacuated tube 11, thus the condensate water 28 can be held in the condensate tank 30 and drained when the train is at its station, or the condensate 28 can be dumped overboard into the evacuated tube 11, if desired, by opening a drain valve of the condensate tank 30.

The quality of the water 20 in the evaporator 22 (e.g., the mass fraction of water to water-vapor) can controlled by the expansion valve 18. The pressure and temperature of the water 20 in the evaporator 22 can be controlled by the evaporator pressure regulator (EPR) valve 27. Both valves 18, 27 can receive commands from an ECS controller 32 in response to feedback from pressure and temperature sensors 34, 36 located in specific/desired locations in the system 10. Furthermore, a heater 38 (e.g., an electrical heater 38) can also be provided to provide cabin heating via heating air 25, when needed.

A separate tank 40 can be charged with high pressure air 42 to provide fresh airflow of air 44 to the cabin 16 and passengers in the cabin 16 via a fresh airflow regulator valve 46. A circulation fan 49 can pump the air 44 through the evaporator 22 and move the air 44 about the cabin 16. Ultimately, the same quantity of fresh air 44 that enters the cabin 16 is exhausted air 48 into the tube 11, maintaining the pressure of the cabin 16 constant via modulation of a cabin pressure regulator 50. It is noted that the tube 11 is evacuated of air, so the cabin 16 should be pressurized for life support.

To provide cooling to the on-board high-powered electronics 51, a liquid media 52 can be used to take advantage of its high heat capacity. The liquid 52 circulates continually through the electronics 51 via a coolant pump 54, then enters the electronics evaporator 56 where its heat is transferred to the relatively cold two-phase water/steam 23. The method of producing cold water and steam is substantially similar to the cabin 16 cooling circuit discussed above. For example, a second portion 15 of water 14 from tank 12 can flow through an electronics expansion valve 58, where the pressure and temperature of the second portion 15 of water 14 is reduced, turning the saturated liquid water 15 into two phase water and vapor (steam) 23. The cold two-phase water 23 enters the electronics evaporator 56 (e.g., via distributor 60) where heat is absorbed from the liquid 52, thus reducing the temperature of the liquid 52 that exits the evaporator 56.

The heat absorbed into the two-phase water 23 does not increase its temperature, but instead results in the water portion 23 completely evaporating, yielding substantially 100% steam 70 exiting the evaporator 56. The quantity of heat absorbed to transform the water 23 into steam 70 is its latent heat of vaporization.

The steam 70 exiting the evaporator 56 can be exhausted into the evacuated tube 11 of system 10 (e.g., along with steam 26 from evaporator 22). As noted above, the pressure inside the on-board water vessel 12 can be sufficiently higher than the pressure inside the tube 11 of system 10, thereby negating the need for a pump.

Also similar to the cabin 16 circuit discussed above, the expansion valve 58 controls the quality of water 23 in the evaporator 56, and the evaporator pressure regulator (EPR) valve 61 controls the pressure and temperature of the water 23 in the evaporator 56. Both valves 58, 61 can receive commands from an ECS controller 32 in response to feedback from pressure and temperature sensors 64, 66 located in specific/desired locations in the system 10. Furthermore, a heater 68 (e.g., an electrical heater 68) can also be provided when cabin 16 heating is needed.

It is noted that the disclosed hyperloop ECS 10 is thermodynamically similar to a standard vapor cycle air conditioning system (VCS) where a refrigerant (e.g., water) heat is absorbed in an exchanger via a phase change (e.g., evaporating liquid to a gas) to take advantage of the high latent heat of evaporation of the refrigerant. However and unlike a standard VCS, the example hyperloop ECS 10 does not need or include a compressor to pump the refrigerant through the system 10 nor a condenser heat exchanger to condense gas refrigerant to a liquid to reject the heat of compression of the compressor to the ambient atmosphere. Since there is no need for a compressor, the example hyperloop ECS 10 of the present disclosure requires only a small fraction of the electrical power of a standard VCS. Power is needed substantially only for the ECS controller 32 and the various valves (e.g., valves 18, 27, 58 and 61). While the vehicle/train and cabin 16 is at its station idle during passenger boarding, the water tank 14 and fresh air tank 40 can be refilled with hot water and air, respectively (e.g., via charge ports 72, 74).

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Although the systems and methods of the present disclosure have been described with reference to example embodiments thereof, the present disclosure is not limited to such example embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A hyperloop vapor cycle environmental control system comprising:
   a vehicle cabin of a vehicle positioned in an air-evacuated tube of a hyperloop;
   a water vessel positioned on board the vehicle, the water vessel housing water and steam at a pressure greater than a pressure of the air-evacuated tube;
   wherein a first portion of the water from the water vessel is configured to flow through a cabin expansion valve where a pressure and a temperature of the first portion of the water is reduced below a temperature of the vehicle cabin thereby turning the first portion of the water into a two-phase water and vapor stream, the two-phase water and vapor stream thereafter configured to enter a first evaporator heat exchanger where the two-phase water and vapor stream absorbs heat from a flow of entering warm cabin air, thereby reducing a temperature of the entering warm cabin air and providing a flow of cooled cabin air that exits the first evaporator heat exchanger, with the cooled cabin air configured to re-enter the vehicle cabin for cooling purposes of the vehicle cabin; and
   wherein the heat absorbed into the two-phase water and vapor stream results in the water from the two-phase water and vapor stream evaporating, thereby yielding produced steam that is configured to exit the first evaporator heat exchanger.

2. The system of claim 1, wherein the flow of entering warm cabin air is cooled without a compressor to pump the first portion of the water and without a condenser heat exchanger to condense a gas refrigerant to a liquid.

3. The system of claim 1, wherein the produced steam is exhausted into the air-evacuated tube.

4. The system of claim 1, wherein a quality of the two-phase water and vapor stream in the first evaporator heat exchanger is configured to be controlled by the cabin expansion valve, and a pressure and a temperature of the two-phase water and vapor stream in the first evaporator heat exchanger is configured to be controlled by an evaporator pressure regulator valve; and
wherein the cabin expansion valve and the evaporator pressure regulator valve are configured to receive commands from a first controller in response to feedback from at least one first pressure sensor or first temperature sensor located in the system.

5. The system of claim 1 further comprising an air tank housing high pressure air, the air tank configured to provide a flow of fresh air to the vehicle cabin via a fresh airflow regulator valve, with a circulation fan configured to pump the flow of fresh air through the first evaporator heat exchanger and move the flow of fresh air about the cabin.

6. The system of claim 1, wherein a second portion of the water from the water vessel is configured to flow through an electronics expansion valve where a pressure and a temperature of the second portion of the water is reduced, thereby turning the second portion of the water into a secondary two-phase water and vapor stream, the secondary two-phase water and vapor stream thereafter configured to enter a second evaporator heat exchanger where the two-phase water and vapor stream absorbs heat from a flow of warmed liquid media flowed through or adjacent to at least one electronic member, thereby reducing a temperature of the entering warmed liquid media and providing a flow of cooled liquid media that exits the second evaporator heat exchanger, with the cooled liquid media configured to be re-flowed through or adjacent to the at least one electronic member for cooling purposes of the at least one electronic member; and
wherein the heat absorbed into the secondary two-phase water and vapor stream results in the water from the secondary two-phase water and vapor stream evaporating, thereby yielding secondary produced steam that is configured to exit the second evaporator heat exchanger.

7. The system of claim 6, wherein the flow of entering warmed liquid media is cooled without a compressor to pump the second portion of the water and without a condenser heat exchanger to condense a gas refrigerant to a liquid.

8. The system of claim 6, wherein the secondary produced steam is exhausted into the air-evacuated tube.

9. The system of claim 6, wherein a quality of the secondary two-phase water and vapor stream in the second evaporator heat exchanger is configured to be controlled by the electronics expansion valve, and a pressure and a temperature of the secondary two-phase water and vapor stream in the second evaporator heat exchanger is configured to be controlled by a secondary evaporator pressure regulator valve; and
wherein the electronics expansion valve and the secondary evaporator pressure regulator valve are configured to receive commands from a second controller in response to feedback from at least one second pressure sensor or second temperature sensor located in the system.

10. The system of claim 1, wherein the vehicle is a train and the vehicle cabin is a train cabin.

11. A method for operating a hyperloop vapor cycle environmental control system for a vehicle cabin of a vehicle positioned in an air-evacuated tube of a hyperloop, the vehicle including a water vessel positioned on board the vehicle, the water vessel housing water and steam at a pressure greater than a pressure of the air-evacuated tube; the method comprising:
determining that the vehicle cabin should be cooled;
flowing a first portion of the water from the water vessel through a cabin expansion valve where a pressure and a temperature of the first portion of the water is reduced below a temperature of the vehicle cabin thereby turning the first portion of the water into a two-phase water and vapor stream, the two-phase water and vapor stream thereafter entering a first evaporator heat exchanger where the two-phase water and vapor stream absorbs heat from a flow of entering warm cabin air thereby reducing a temperature of the entering warm cabin air and providing a flow of cooled cabin air that exits the first evaporator heat exchanger, with the cooled cabin air re-entering the vehicle cabin for cooling purposes of the vehicle cabin; and
wherein the heat absorbed into the two-phase water and vapor stream results in the water from the two-phase water and vapor stream evaporating, thereby yielding produced steam that exits the first evaporator heat exchanger.

12. The method of claim 11, wherein the flow of entering warm cabin air is cooled without a compressor to pump the first portion of the water and without a condenser heat exchanger to condense a gas refrigerant to a liquid.

13. The method of claim 11 further comprising exhausting the produced steam into the air-evacuated tube.

14. The method of claim 11 further comprising controlling a quality of the two-phase water and vapor stream in the first evaporator heat exchanger by the cabin expansion valve, and controlling a pressure and a temperature of the two-phase water and vapor stream in the first evaporator heat exchanger by an evaporator pressure regulator valve; and
wherein the cabin expansion valve and the evaporator pressure regulator valve are configured to receive commands from a first controller in response to feedback from at least one first pressure sensor or first temperature sensor located in the system.

15. The method of claim 11 further comprising an air tank housing high pressure air, the air tank providing a flow of fresh air to the vehicle cabin via a fresh airflow regulator valve, with a circulation fan pumping the flow of fresh air through the first evaporator heat exchanger and moving the flow of fresh air about the cabin.

16. The method of claim 11, wherein a second portion of the water from the water vessel is configured to flow through an electronics expansion valve where a pressure and a temperature of the second portion of the water is reduced, thereby turning the second portion of the water into a secondary two-phase water and vapor stream, the secondary two-phase water and vapor stream thereafter entering a second evaporator heat exchanger where the two-phase water and vapor stream absorbs heat from a flow of warmed liquid media flowed through or adjacent to the at least one electronic member, thereby reducing a temperature of the entering warmed liquid media and providing a flow of cooled liquid media that exits the second evaporator heat exchanger, with the cooled liquid media re-flowing through or adjacent to the at least one electronic member for cooling purposes of the at least one electronic member; and wherein the heat absorbed into the secondary two-phase water and vapor stream results in the water from the secondary two-phase water and vapor stream evaporating, thereby yielding secondary produced steam that exits the second evaporator heat exchanger.

17. The method of claim 16, wherein the flow of entering warmed liquid media is cooled without a compressor to pump the second portion of the water and without a condenser heat exchanger to condense a gas refrigerant to a liquid.

18. The method of claim 16 further comprising exhausting the secondary produced steam into the air-evacuated tube.

19. The method of claim 16 further comprising controlling a quality of the secondary two-phase water and vapor stream in the second evaporator heat exchanger by the electronics expansion valve, and controlling a pressure and a temperature of the secondary two-phase water and vapor stream in the second evaporator heat exchanger by a secondary evaporator pressure regulator valve; and wherein the electronics expansion valve and the secondary evaporator pressure regulator valve are configured to receive commands from a second controller in response to feedback from at least one second pressure sensor or second temperature sensor located in the system.

20. The method of claim 11, wherein the vehicle is a train and the vehicle cabin is a train cabin.

* * * * *